June 16, 1931.  H. HEROY  1,809,899
ELECTRICALLY OPERATED WATER HEATER
Filed July 3, 1929  6 Sheets-Sheet 1
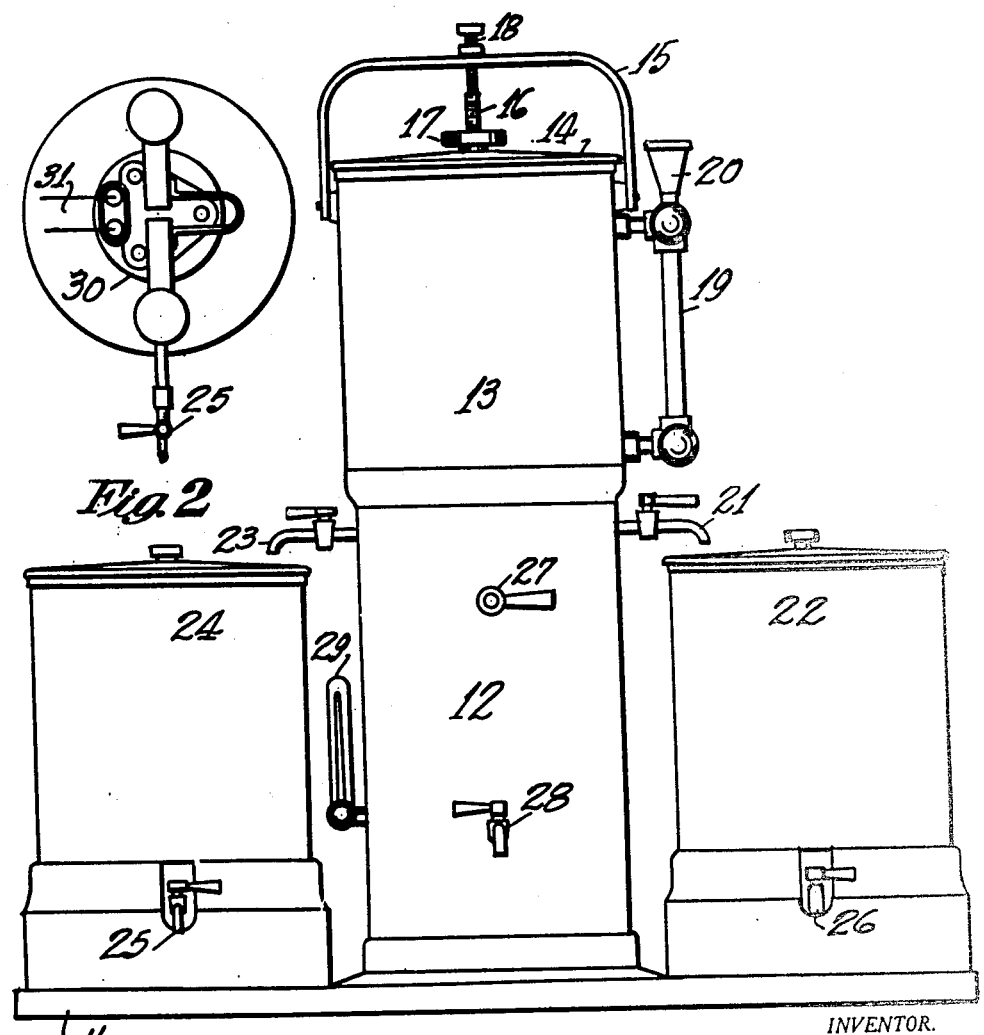
INVENTOR.
Herbert Heroy,
BY
ATTORNEY.

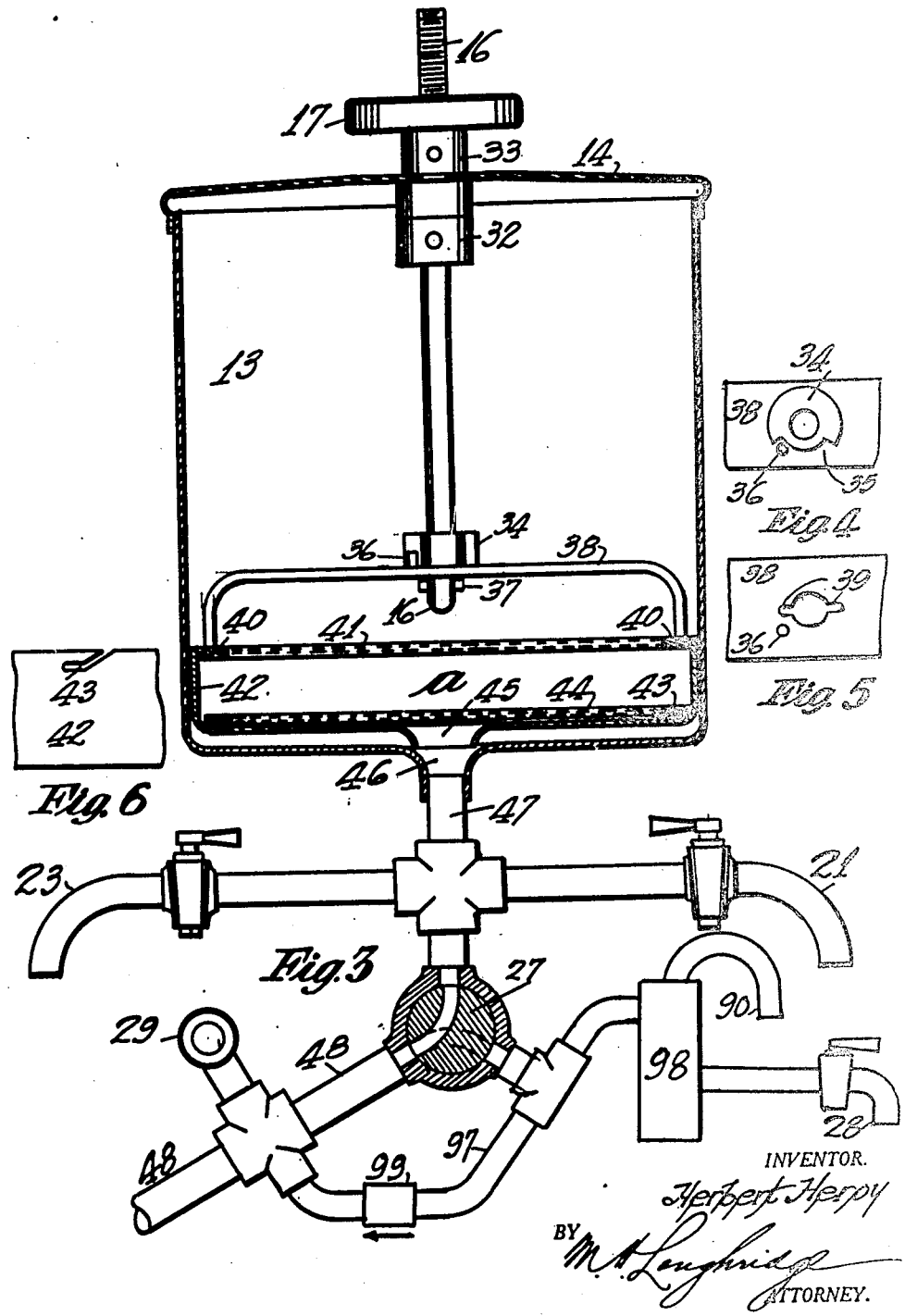

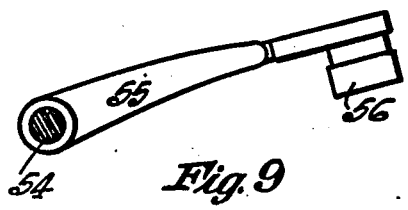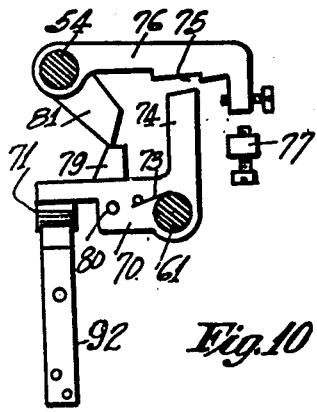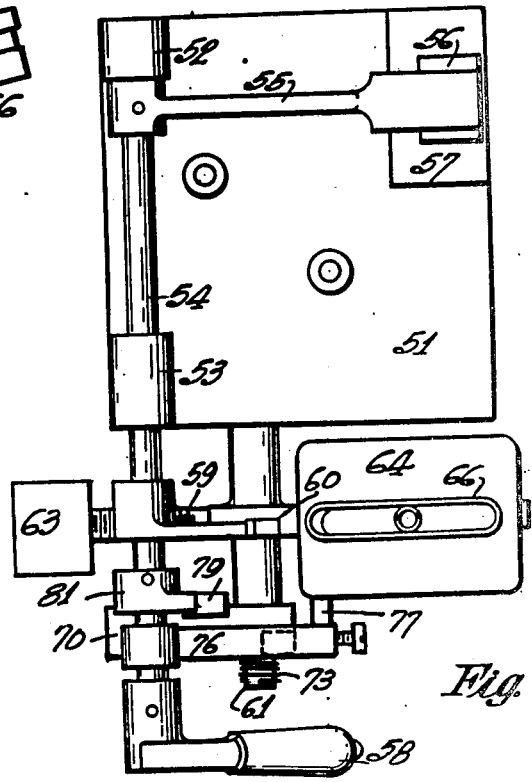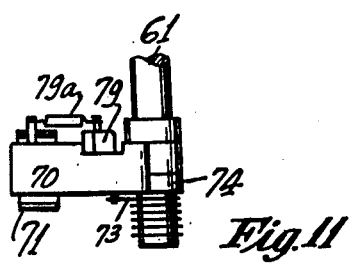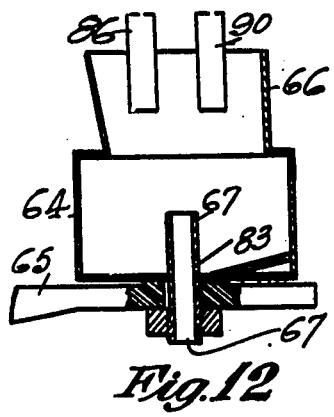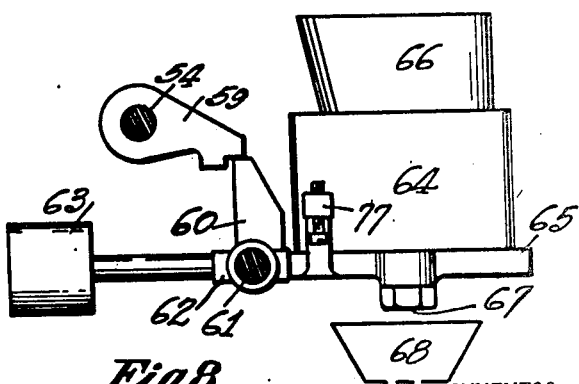

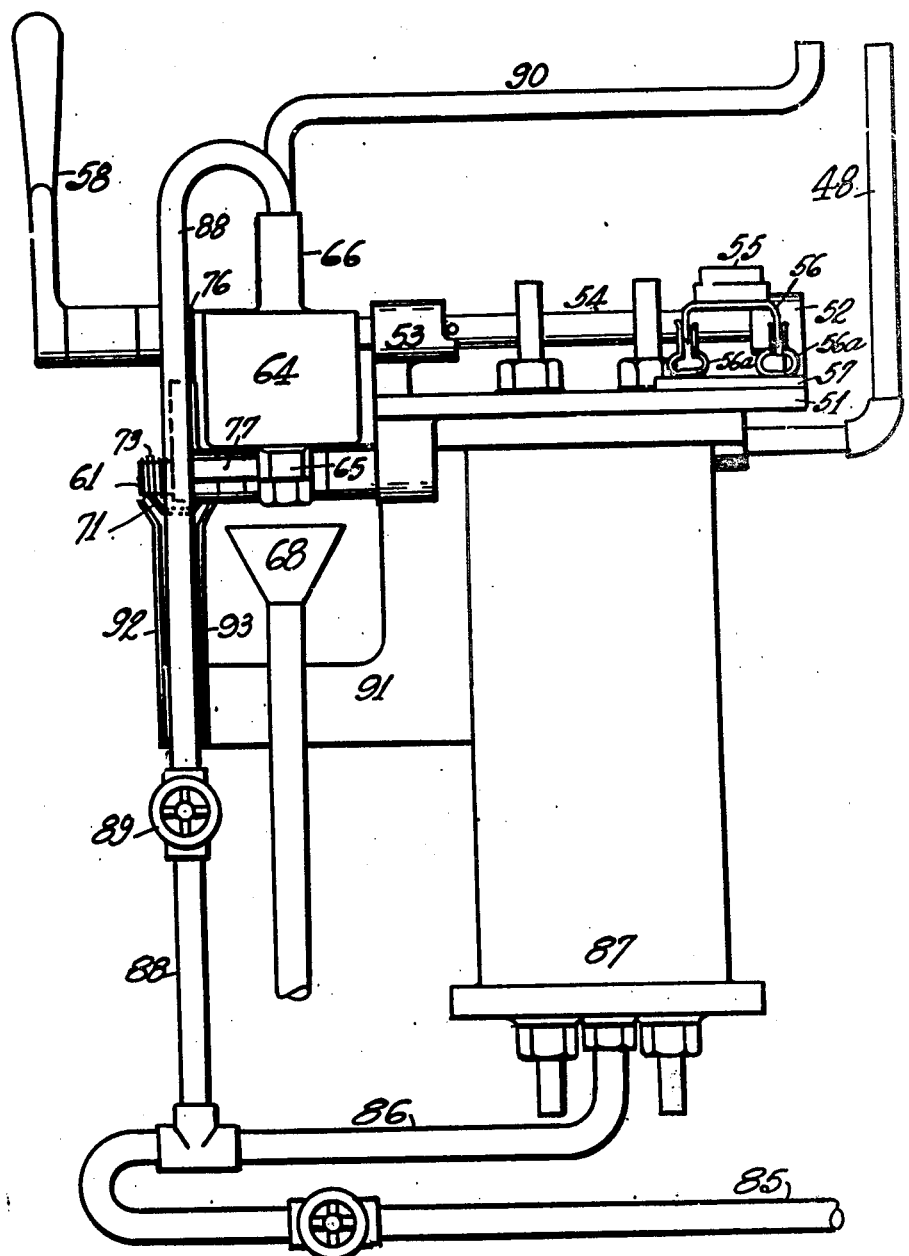

June 16, 1931.  H. HEROY  1,809,899
ELECTRICALLY OPERATED WATER HEATER
Filed July 3, 1929  6 Sheets-Sheet 6

INVENTOR.
Herbert Heroy
BY
M. H. Laughridge
ATTORNEY.

Patented June 16, 1931

1,809,899

UNITED STATES PATENT OFFICE

HERBERT HEROY, OF BELMAR, NEW JERSEY

ELECTRICALLY OPERATED WATER HEATER

Application filed July 3, 1929. Serial No. 375,645.

This invention relates to electric heating apparatus for liquids and is shown applied to infusion machines. Its objects are to provide an electric system for heating water to a regulated temperature; to provide a system automatically controlled by the water supply; to provide a system which is manually brought into operation and which is automatically taken out of operation upon failure of the water supply; to provide a system in which the electric supply cannot be turned on until the water supply is present and to provide certain novel features in the construction of an electric heating unit. Other objects of the invention will appear from the following specifications and the accompanying drawings, in which, Fig. 1 is an elevation of a coffee infusion machine embodying the features of my invention;

Fig. 2 shows the application of an electric heating unit to the base of one of the receptacles used in Fig. 1;

Fig. 3 is an elevation, partly sectioned, of the coffee urn and the pipe connections shown in Fig. 1;

Figure 14:
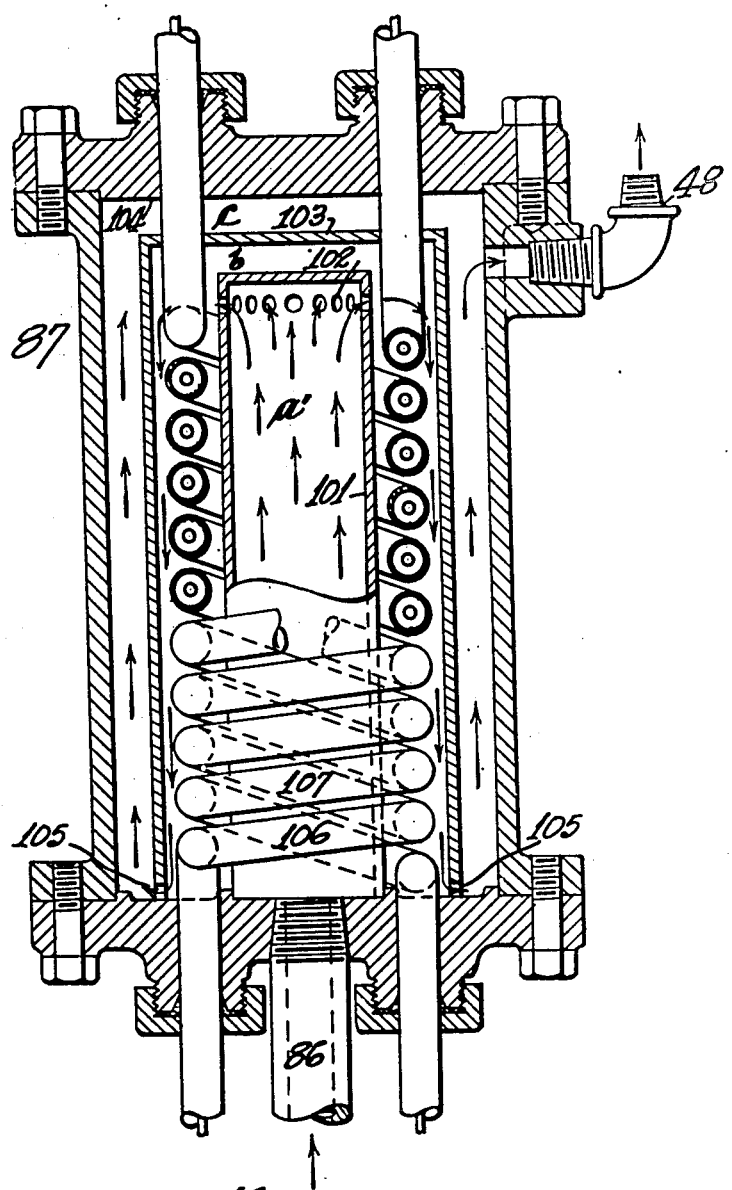
Figure 15:
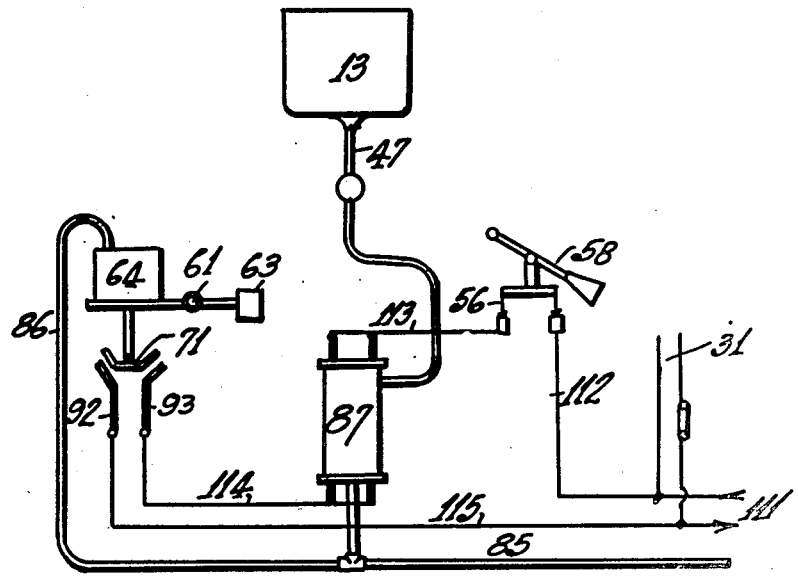
Figure 16:
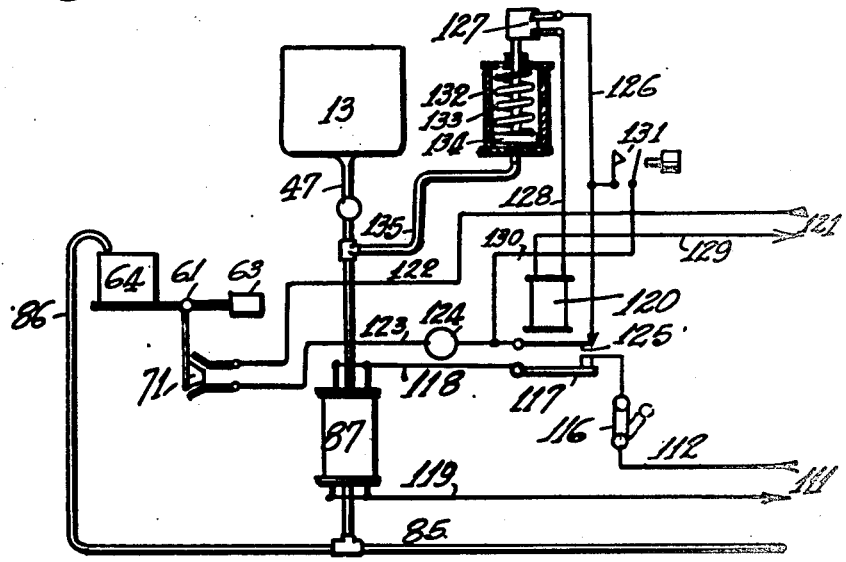

Figs. 4, 5, and 6 are details of the construction shown in Fig. 3;

Fig. 7 is a plan view of the operating mechanism used in Fig. 1;

Fig. 8 is a side elevation of the float mechanism shown in Fig. 7;

Figs. 9, 10, 11 and 12 are details of the operating mechanism as shown in Fig. 7;
Fig. 13 is a front elevation of the operating mechanism, the electric heating unit and the pipe connections;

Fig. 14 shows the construction of the electric heating unit and is partly sectioned to show the interior thereof;

Fig. 15 is one arrangement of circuits that may be used with the mechanism shown in Figs. 7 and 13, and Fig. 16 is a modified arrangement of circuits in which a relay is used to perform certain of the results secured by the latching mechanism in Fig. 7.

In the application of electricity as a means for heating water for domestic purposes such as in the coffee infusion machine herein described, certain advantages arise in convenience, sanitation and quick supply. The usual practice is to bring an electric heating element into intimate association with a water supply. In machines of the type contemplated it is desirable that the water be freshly heated immediately before using and it should not be heated above the boiling point to generate steam. These conditions make it necessary to provide a heating element of a comparatively large capacity, such for instance, as will produce two gallons of boiling water in from ten to twelve minutes. A heating element of this capacity will form steam very rapidly, or will cause injury to itself if the water supply should be cut off and, to guard against this possibility, an automatic control system is provided which may be operated mechanically or electrically. This arrangement is operated by an overflow of the water fed to the heating unit which, through a float arrangement, maintains the circuit of the heating unit and which automatically disconnects this circuit as soon as the supply through the overflow ceases. This float arrangement, in addition, embodies a locking feature whereby the circuit of the heating unit cannot be closed until the overflow is established, also once the float mechanism has interrupted the circuit of the heating unit it cannot be again reestablished by the renewal of the overflow until the apparatus is manually reset.

In the drawings, 11 is the base of the upper part of the mechanism, 12 is the cover enclosing the piping to the coffee urn 13 and the hot water reservoir, 14 is the cover of the coffee urn which is held in place by the bail 15 to which it is adjustably connected by the screw stem 16 and the screw 18. A water gage is provided at 19 with a safety valve at 20. The coffee is drawn off from the urn 13 through the faucet 21 to supply the receptacle 22 and through faucet 23 to supply receptacle 24. The liquid in these receptacles is maintained at a uniform heat by the electric heating element 30 connected with the electric supply 31 and applied to the base of the jars 22 and 24. This electric heating element is a commercial device which, of itself, forms no part of the present invention.

The construction of the coffee urn and the connection thereto will be understood from Fig. 3. A basket 42 is provided having an aperture 45 registering with 46 and with the pipe 47 which, through the three-way valve 27 connects with the supply pipe 48 and with the thermostat 29 which indicates the temperature of the water supply. The basket 42 is preferably provided with a ring 43 supporting a coarse and a fine wire mesh indicated at 44 and another wire mesh of the same type indicated at 41 is supported by ring 40 and encloses the space $a$ in which the ground coffee is placed. The ring 40 is secured by bayonet slots indicated at 43, Fig. 6 to basket 42 and to this ring, the bridge piece 38 is secured by welding or otherwise. This bridge piece is provided with an aperture to receive the stem 16 which aperture is recessed at 39, Fig. 5, to receive the transverse pin 37 thereby locking stem 16 to 38 except when 37 registers with 39. The stem 16 is provided with a collar 34 which has a portion of reduced diameter indicated at 35, Fig. 4, to receive 36 which is riveted to 38 and limits the rotary movement of the stem 16 relative to the basket 42. The cover of the urn 13 is clamped between the collars 32 and 33 as shown. An insulated disk 17 is provided on stem 16 whereby the basket 42 and the cover 14 may be removed from, or installed in the urn 13. By rotating 17 in one direction the ring 40 is disengaged from the basket 42 thereby permitting a renewal of the coffee in the space $a$, and by rotating the disk 17 in the opposite direction the pin 37 registers with 39 thus enabling the bridge piece 38 to be disconnected from the stem.

In operation, the water from the heating element is fed through pipe 48 and the three-way valve 27 to pipe 47 and to the urn 13 through the coffee in the basket $a$. When the coffee urn is supplied with sufficient water the three-way valve 27 is reversed thereby turning the heated water into the pipe 97 connecting with the hot water reservoir 98 which connects with the hot water faucet 28 and the overflow pipe 90. The pipe 97 connects with pipe 48 through the check valve 99 thus permitting the water in the reservoir 98 to feed back into pipe 48 and thus back into the heating unit in case the water pressure in pipe 48 should fail.

The heating unit hereinafter referred to is controlled by the mechanism indicated in Fig. 7 which controls its circuit at two points. This mechanism comprises a base plate 51 supporting the bearings 52 and 53 of the manually operated shaft 54. On this shaft the arm 55 is mounted and carries the contact member 56 engaging the contacts 56a mounted on the insulation 57. The shaft 54 is manually operated by the handle 58 to open and close the circuit through 56.

A float mechanism is mounted on shaft 61 through the bearing 62, Fig. 8, and which supports the arm 65 carrying the float tank 64 and an oppositely disposed arm upon which the counter weight 63 is adjustably mounted. The float tank 64 is provided with an overflow pipe 67 which extends upwards from the bottom into this tank and is provided with a restricted aperture at 83 whereby water accumulating in this tank from the overflow pipes 86 and 90 connected through funnel 66, flows off through the bottom of the tank into the waste receptacle 68. This water flows off at a restricted rate through the orifice 83 until the water rises above the top of pipe 67 when it flows off without restriction.

The tank 64 is arranged to over balance the counter weight 63 before the water rises to the top of pipe 67 and as long as the overflow to this tank is maintained at a rate equal to, or in excess of the flow through orifice 83 this over balancing will be maintained, on the other hand as soon as the water in tank 64 is reduced so as to be over balanced by 63 the tank is tilted upwards and remains in this position until the condition of over balancing by 64 is again established.

In order to prevent the manual closing of switch 56 a locking engagement is provided between the float 64 and shaft 54 comprising the cam 59 secured to shaft 54 and arranged to engage the detent 60 secured to 62 and moving with 64. In the position shown in Fig. 8 it will be noted that the shaft 54 cannot be rotated to close switch 56 until the tank 64 is tilted downwards by water from the overflow pipe. At the same time the shaft 54 may be rotated in the opposite direction, without restriction, to open the switch 56.

The movement of the tank 64, when tilted upwards, interrupts another circuit leading to the heating unit. This is secured through the arm 70 mounted on shaft 61 and carrying an insulated contact plate 71 which engages the contact springs 92 and 93, Fig. 13, but which is normally biased by the coil spring 73 to open this circuit. This arm is brought into the engaging position by the cam 81 on shaft 54 which engages the dog 79 on arm 70 thus moving the vertical arm 74 forward to be latched at 75 by the arm 76, freely mounted on shaft 54. The continued movement of the shaft 54 moves the cam 81 beyond the engaging position of dog 79 so that when shaft 54 is moved to close switch 56 the parts 81 and 79 are disengaged and 70 is free to move under the action of spring 73 when unlatched at 75. The arm 77 moves integral with 65 and with the float 64 so that when the float is tilted upwards this arm engages the end of 76 and unlatches 74 thereby permitting spring 73 to open the circuit at 71 and thus interrupting the current supply to the heating unit. It will be noted that the arm 70 is not self restoring when the float is tilted in the opposite direction so that once the circuit is interrupted it remains interrupted until the mechanism is manually reset by the handle 58. The switch 56 may be opened at any time by the handle 58 but if the arm 70 has been latched in the closed position it remains in this position. The reverse engagement of cam 81 is released by the pivoted mounting of dog 79 at 80 which can be freely moved backwards relative to 70 and which is normally held in the engaging position by the spring 79a.

In Fig. 13 the water supply pipe 85 connects through a valve to the pipe 86 which feeds the electric heating unit 87 and discharges hot water into pipe 48 leading to the coffee urn. An overflow pipe 88 connects to pipe 86 and the extent of the overflow is regulated by valve 89. The valves are used to regulate the water flow to the heating unit and to the overflow tank 64 to obtain the regulation desired. A bracket 91 formed integral with plate 52 supports the insulated contact fingers 92 and 93 in register with 71.

The electric heating element as illustrated in Fig. 14 comprises an electric heating coil, preferably in a double spiral, and comprising a michrome wire placed inside a copper tube and supported by a suitable filler. This is a commercial product which, of itself, forms no part of the present invention. The intake pipe 86 connects to an inner tube 101 which is perforated at the top as indicated at 102. An outer tube 103 with a closed end incloses the inner tube and incloses the double spiral of the electric coil as shown. This tube is provided with perforated outlets 105 around the bottom. An outer tube or shell 87 encloses the mechanism and is provided with the outlet 48 for the hot water supply. It will be noted that the cold water is first supplied to chamber a', from there it passes into chamber b in which the heating coil is located and from there it passes into chamber c and to the outlet at 48 as indicated by the arrows. The flow of water is thus evenly distributed over the coils 106 and 107 of the electric heater which provides a comparatively large heating area and is capable of bringing the water to the boiling point as it passes through the device. The extent to which the water is heated by the device can be regulated by the valve controlling the supply, this valve can be adjusted so that the water supplied to the heating unit will be raised to the boiling point but will not be converted into steam. A device of this kind heats very rapidly and if the heat is not carried away by the water flow, the coils are liable to burn out, hence, the automatic control system described above is necessary in the practical operation of this device.

The diagram in Fig. 15 shows one arrangement of controlling circuits for use with this device. The electric supply mains 111 connects by wire 112 through switch 56 and wire 113 to the heating element 87 and by wire 114 to contact 93, switch 71, contact 92, and wire 115 to supply. The double spiral of the heating coil is preferably connected in multiple between the wires 113 and 114 as shown. The circuit of the heating coil is controlled in series by switches 56 and 71 and may be interrupted by either of the switches.

The diagram in Fig. 16 shows a modified arrangement of control in which the latching mechanism associated with the shaft 54 is not required, the equivalent results being obtained by the use of a stick relay. This arrangement also embodies a control which will disconnect the heating coil if steam should be generated in the system. This control may be used alone or used in combination with the float control and overflow system described above.

The electric supply 111 connects by wire 112 through switch 116, contact 117 of relay 120, wire 118, device 87, wire 119 to supply 111. The stick relay 120 is controlled from the supply 121 through wire 122, contact 171, controlled by float 64, wire 123, lamp 124, contact 125 of relay 120, wire 126, contact 127, controlled by piston 134, wire 128, relay 120, wire 129 to supply 121. The cylinder 132 connects by pipe 135 with the heating element 87 and has a piston 134 held in the lower position by a comparatively stiff spring 133, a plunger connects the contact 127 with the piston 134. Under normal conditions the spring 133 holds the contact 127 closed but upon the generation of steam in the system the piston 134 is raised by the increased pressure to open the contact 127 and thereby deenergize stick relay 120 and open the circuit of the heating coil at 117. The circuit described is closed at 71 only when the float is supplied from the overflow so that when the overflow ceases the circuit of relay 120 is deenergized to interrupt the circuit of the heating coil. The lamp 124 provides an indicator showing when this relay is energized.

When relay 120 is deenergized it interrupts its own circuit at 125 and cannot again be energized until the push button 131 is operated to close the circuit from wire 130 to wire 126 around the contact 125, thus the system is not self restoring once relay 120 has been deenergized. It will be noted that the circuit to 87 may be interrupted at any time by switch 116 without disturbing the operation of relay 120.

Having thus described my invention, I claim:

1. In an electric water heater as described, the combination, a heating coil connected with an electric supply, a water supply for said coil, a float connected by an overflow to said water supply, a circuit controller controlling the circuit of said coil operated by said float and means for automatically disconnecting said circuit when the water ceases to flow in said overflow and for preventing said circuit being automatically restored after it is disconnected.

2. In an electric water heater, the combination a heating unit connected with an electric supply, a water supply for said unit, an overflow for the water from said unit, a float connected with said overflow, a switch controlling said electric supply and a co-operative connection between said switch and said float for opening said switch and for preventing said switch being automatically closed after it is opened.

3. In an electric water heater, the combination a heating unit connected with an electric supply, a water supply for said unit, an overflow for the water from said unit, a pivotally mounted float tank receiving the water from said overflow, a manually operated switch controlling said electric supply and a switch automatically controlled by the water in said float tank controlling said electric supply.

4. In an electric water heater, the combination a heating unit connected with an electric supply, a water supply for said unit, an overflow for the water from said unit, a pivotally mounted float tank receiving water from said overflow, and a manually operated control for said electric heating unit, said float tank controlling said manual operation.

5. In an electric heating unit the combination a housing enclosing a heating coil and connected with a water supply, a pivotally mounted float tank receiving water from said water supply and arranged to close a circuit controlling said coil as long as a predetermined quantity of water is maintained in said tank.

6. In an electric heating unit the combination a housing enclosing a heating coil and connected with a water supply, a pivotally mounted float tank connected with said water supply and arranged to close a circuit controlling said coil by a predetermined quantity of water in said tank and opening said circuit when said water supply falls below a predetermined value.

7. In an electric heating unit, the combination, a housing enclosing a heating coil and connected with a water supply, a float connected with an overflow from said water supply and arranged to close the circuit of said coil by said overflow after the lapse of a predetermined time interval.

8. In an electric heating unit, the combination, a housing enclosing a heating coil and connected with a water supply, a balanced float connected by an overflow pipe with said water supply controlling the circuit of said coil and means preventing said circuit being automatically restored once it is interrupted.

9. In an electric heating unit, the combination, a housing enclosing a heating coil and connected with a water supply, a float tank balanced on a pivot continuously responsive to the flow of water in said supply and means responsive to pressure in said housing, both of said means controlling the circuit of said heating coil.

10. In an electric heating unit, the combination, a housing enclosing a heating coil and connected with a water supply, and means controlled by the continuous flow of water in said supply and operating after the lapse of a time interval for interrupting the circuit of said coil.

11. A controlling system for an electric heating unit comprising a water supply for said unit, an overflow deflected from said supply, and means balanced on a pivot maintained in an active position by said overflow for interrupting the circuit to said unit.

In testimony whereof I affix my signature.

HERBERT HEROY.